(12) United States Patent
Okada et al.

(10) Patent No.: US 7,147,150 B2
(45) Date of Patent: Dec. 12, 2006

(54) PERSONAL IDENTIFICATION TERMINAL AND METHOD HAVING SELECTABLE IDENTIFICATION MEANS OR IDENTIFICATION LEVELS

(75) Inventors: Souichi Okada, Kawasaki (JP); Takayuki Hasebe, Kawasaki (JP); Jun Kamada, Kawasaki (JP); Takehiko Hayashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 40 days.

(21) Appl. No.: 10/720,085

(22) Filed: Nov. 25, 2003

(65) Prior Publication Data
US 2004/0104265 A1    Jun. 3, 2004

(30) Foreign Application Priority Data
Nov. 28, 2002    (JP)    ............... 2002-345852

(51) Int. Cl.
    *G06K 5/00*    (2006.01)
(52) U.S. Cl. .................. 235/380; 235/375; 235/492
(58) Field of Classification Search ............... 235/375, 235/379, 380, 382, 382.5, 492
See application file for complete search history.

(56) References Cited

U.S. PATENT DOCUMENTS

| | | | | |
|---|---|---|---|---|
| 4,993,068 A | * | 2/1991 | Piosenka et al. ............ | 713/186 |
| 5,469,506 A | * | 11/1995 | Berson et al. ............... | 713/186 |
| 5,604,802 A | * | 2/1997 | Holloway .................... | 705/66 |
| 5,648,648 A | * | 7/1997 | Chou et al. .................. | 235/382 |
| 5,694,471 A | * | 12/1997 | Chen et al. ................... | 705/76 |
| 5,719,560 A | * | 2/1998 | Watkins ....................... | 340/5.5 |
| 5,721,781 A | * | 2/1998 | Deo et al. ..................... | 705/67 |
| 5,724,423 A | * | 3/1998 | Khello .......................... | 713/184 |
| 6,026,166 A | * | 2/2000 | LeBourgeois ............... | 713/156 |
| 6,085,322 A | * | 7/2000 | Romney et al. ............. | 713/176 |
| 6,213,391 B1 | * | 4/2001 | Lewis .......................... | 235/380 |
| 6,282,658 B1 | * | 8/2001 | French et al. .................. | 726/7 |
| 6,595,415 B1 | * | 7/2003 | Niwata et al. .............. | 235/380 |
| 6,655,585 B1 | * | 12/2003 | Shinn .......................... | 235/382 |
| 6,662,166 B1 | * | 12/2003 | Pare et al. .................... | 705/39 |
| 6,715,672 B1 | * | 4/2004 | Tetro et al. .................. | 235/380 |
| 6,802,007 B1 | * | 10/2004 | Canelones et al. .......... | 713/193 |
| 6,834,795 B1 | * | 12/2004 | Rasmussen et al. ........ | 235/380 |
| 6,836,843 B1 | * | 12/2004 | Seroussi et al. ............ | 713/173 |

FOREIGN PATENT DOCUMENTS

| | | |
|---|---|---|
| JP | 11-338985 | 12/1999 |
| JP | 2000-137844 | 5/2000 |
| JP | 2000-215172 | 8/2000 |
| JP | 2000-215279 | 8/2000 |
| JP | 2000-242786 | 9/2000 |
| JP | 2002-112340 | 4/2002 |

* cited by examiner

*Primary Examiner*—Ahshik Kim
(74) *Attorney, Agent, or Firm*—Staas & Halsey LLP

(57) ABSTRACT

A personal identification terminal includes a plurality of identification means or a plurality of identification levels that are selectable for use, and means for selecting one of the plural identification means or one of the identification levels in accordance with identification means/level setting information that is received from a server every time when receiving a request for identification from the server. The personal identification terminal sends used means/level information that indicates one of the identification means or one of the identification levels that was used for the real identification back to the server in a format that enables detection of an alteration thereof together with a result of the identification.

16 Claims, 7 Drawing Sheets

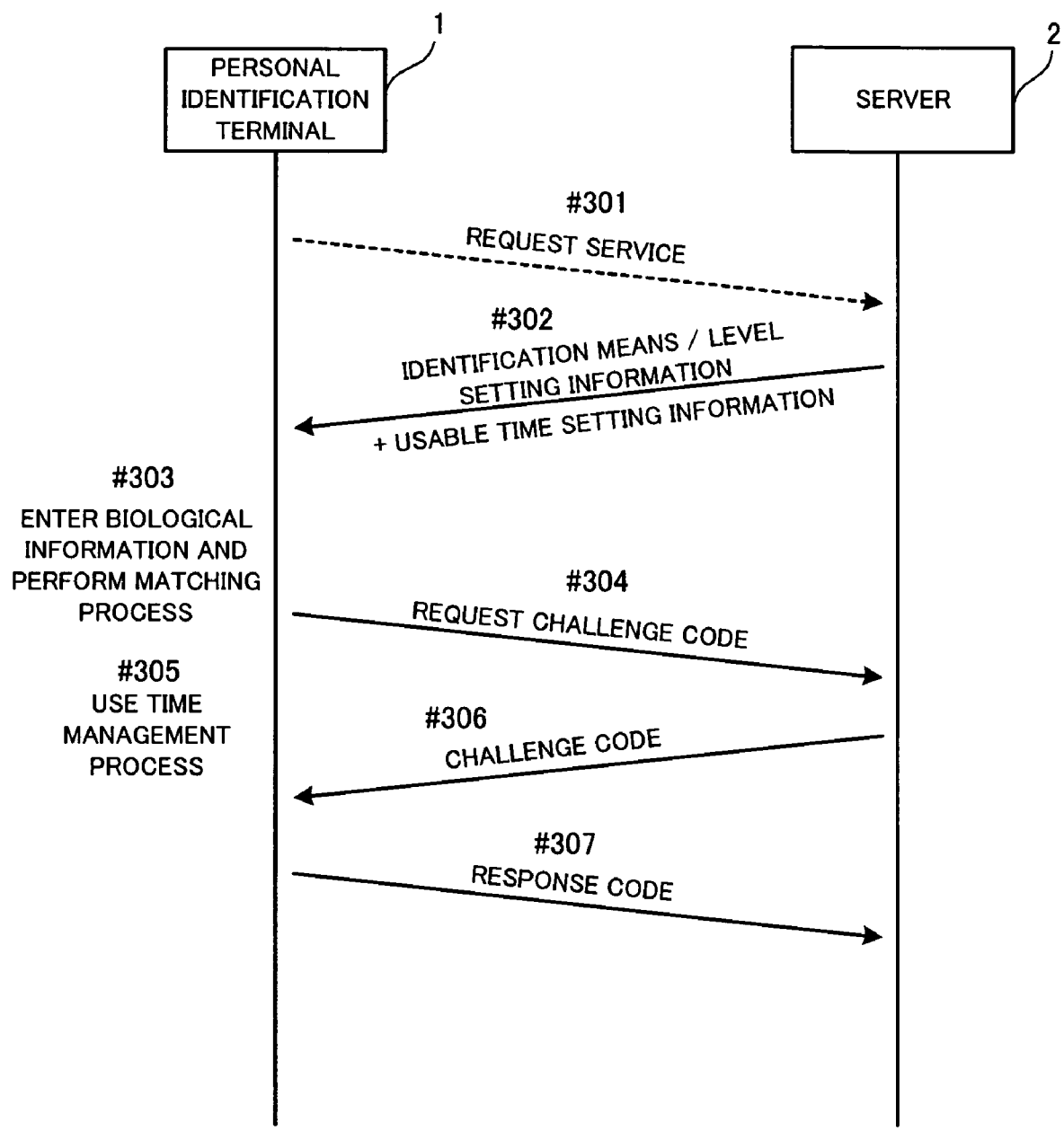

PERSONAL IDENTIFICATION TERMINAL AND METHOD HAVING SELECTABLE IDENTIFICATION MEANS OR IDENTIFICATION LEVELS

BACKGROUND OF THE INVENTION

1. Field of the Invention

The present invention relates to a personal identification terminal and a personal identification method in which a plurality of identification means is provided so that one of identification means or one of identification levels can be selected to be used in accordance with a purpose of the identification or a security level. The present invention also relates to a computer program that is used for the personal identification.

2. Description of the Prior Art

A personal identification technique for identifying a person to be a registered one by utilizing a thing such as an ID card, memorized information such as a password or biometric information such as a finger print is used for a room access control, a log in control of a personal computer or others. The personal identification technique covers from a relatively simple one utilizing a password or an ID card to a high-tech one utilizing a finger print, a voice pattern, an iris pattern or other information. Furthermore, there is a technique in which plural sorts of (multimodal) identification means or identification levels are provided for improving security by combining the multimodal identification means or identification levels.

For example, Japanese unexamined patent publication No. 2000-137844 discloses a technique in which one of identification means (including a magnetic card, an IC card and a finger print) is selected to be used in accordance with a working time or a room situation. Japanese unexamined patent publication No. 2000-145219 discloses a technique in which an accuracy (a level) of the identification by biometric information is set in accordance with a security level of the room. Japanese unexamined patent publication No. 2000-215172 discloses a technique in which identification means (a PIN, biometric information or a password) is changed in accordance with the security level. Japanese unexamined patent publication No. 2000-215279 discloses a technique in which identification means (a PIN or a finger print) is changed in accordance with the settlement amount.

There is a method of using a personal identification device of the above-mentioned techniques as a personal identification terminal connected to a server. When a user wants to obtain a service from the server, the user enters an ID code, a password, biometric information or others by using the personal identification terminal. After the user is identified to be a registered user, the user can obtain the desired service. In this case, the personal information such as biometric information is managed at the personal identification terminal side. When the server requests execution of the personal identification to the personal identification device, the result of the identification is sent from the personal identification device to the server.

If a user is required to select one of identification means or one of identification levels to be used in the personal identification terminal that has a plurality of identification means or a plurality of identification levels, usability of the personal identification terminal would be bad because such selection operation becomes a burden for the user. In addition, even if the identification means or the identification level to be used is designated by an instruction from the server, there is a risk of security as follows. Namely, if only the result of the identification is sent from the personal identification terminal to the server, an user with a malicious intention can alter the identification means to a convenient one at the personal identification terminal side or degrade the identification level for fraudulent usage.

SUMMARY OF THE INVENTION

An object of the present invention is to prevent fraudulent usage by a user with a malicious intention so as to improve security and reliability of a result of identification in a personal identification terminal that performs personal identification responding to a request for identification from a server.

A personal identification terminal according to the present invention includes a plurality of identification means or a plurality of identification levels that are selectable for use and means for selecting one of the plural identification means or one of the identification levels in accordance with identification means/level setting information that is received from a server every time when receiving a request for identification from the server.

According to this configuration, identification means or an identification level to be used is designated to the personal identification terminal by an instruction from a server, so that a burden of a user is reduced and usability is improved.

Preferably, the identification means/level setting information includes a digital signature or other information for detecting an alteration thereof. Thus, security of the personal identification is enhanced.

It is also preferable that if the identification means or the identification level that is designated by the identification means/level setting information does not exist, default identification means or identification level is used so as to perform the personal identification. In this way, even if an incorrect identification means or identification level is designated by the server, the personal identification terminal can continue the process without halting.

In addition, the personal identification terminal according to the present invention sends used means/level information that indicates one of the identification means or one of the identification levels that was used for the real identification to the server in a format that enables detection of an alteration thereof together with a result of the identification. In this way, the server can confirm that the personal identification was performed correctly by the designated identification means or identification level. In other words, fraudulent usage can be prevented in which a user having a malicious intention alters the identification means to a convenient one or degrades the identification level at the personal identification terminal side.

The above-mentioned format that enables detection of an alteration is preferably based on a network authentication protocol utilizing a secret key. In this case, it is more preferable to use different secret keys for different identification means or different identification levels.

Furthermore, the personal identification terminal according to the present invention preferably adds a score indicating a similarity or a hash value of the score to the information of the result of the identification when using identification means utilizing biometric information (such as a finger print, a voice pattern, or an iris pattern). Since not only the result of the identification such as OK or NG, but the score or the hash value of the score is added, the server can support more delicately. Though the score can be sent as plaintext, it is better for higher security to send the hash value of the score.

A method for personal identification according to the present invention includes the steps of sending identification means/level setting information together with a request for identification from a server to a personal identification terminal including a plurality of identification means or a plurality of identification levels that are selectable for use, selecting one of the plural identification means or one of the identification levels by the personal identification terminal in accordance with the identification means/level setting information that is received from the server, and sending used means/level information that indicates one of the identification means or one of the identification levels that was used for the real identification from the personal identification terminal to the server in a format that enables detection of an alteration thereof together with a result of the identification.

According to this method for personal identification, a burden of a user operation is reduced and usability of the personal identification terminal is improved. In addition, it can be prevented that a user having a malicious intention alters the identification means to a convenient one at the personal identification terminal side or degrades the identification level.

A computer program according to the present invention is installed in a personal identification terminal having a plurality of identification means or a plurality of identification levels that are selectable for use. The computer program makes a processor of the personal identification terminal execute the process including the steps of selecting one of the plural identification means or one of the identification levels to be used in accordance with identification means/level setting information that is received from a server every time when receiving a request for identification from the server, and sending used means/level information that indicates one of the identification means or one of the identification levels that was used for the real identification to the server in a format that enables detection of an alteration thereof together with a result of the identification.

Since the processor executes this computer program, a burden of a user operation is reduced and usability of the personal identification terminal is improved. In addition, it can be prevented that a user having a malicious intention alters the identification means to a convenient one at the personal identification terminal side or degrades the identification level.

This computer program can be supplied in a form recorded in a computer readable storage medium such as a CD-ROM, installed from the storage medium to a computer and is executed. Alternatively, this computer program can be downloaded from another computer such as a server connected to a network for installation or on-line execution.

BRIEF DESCRIPTION OF THE DRAWINGS

FIG. 7 is a diagram showing an example of a structure for limiting the number of usable times of a secret key of a user when a result of the identification is OK.

DESCRIPTION OF THE PREFERRED EMBODIMENTS

Hereinafter, the present invention will be explained more in detail with reference to embodiments and drawings.

Figure 1:
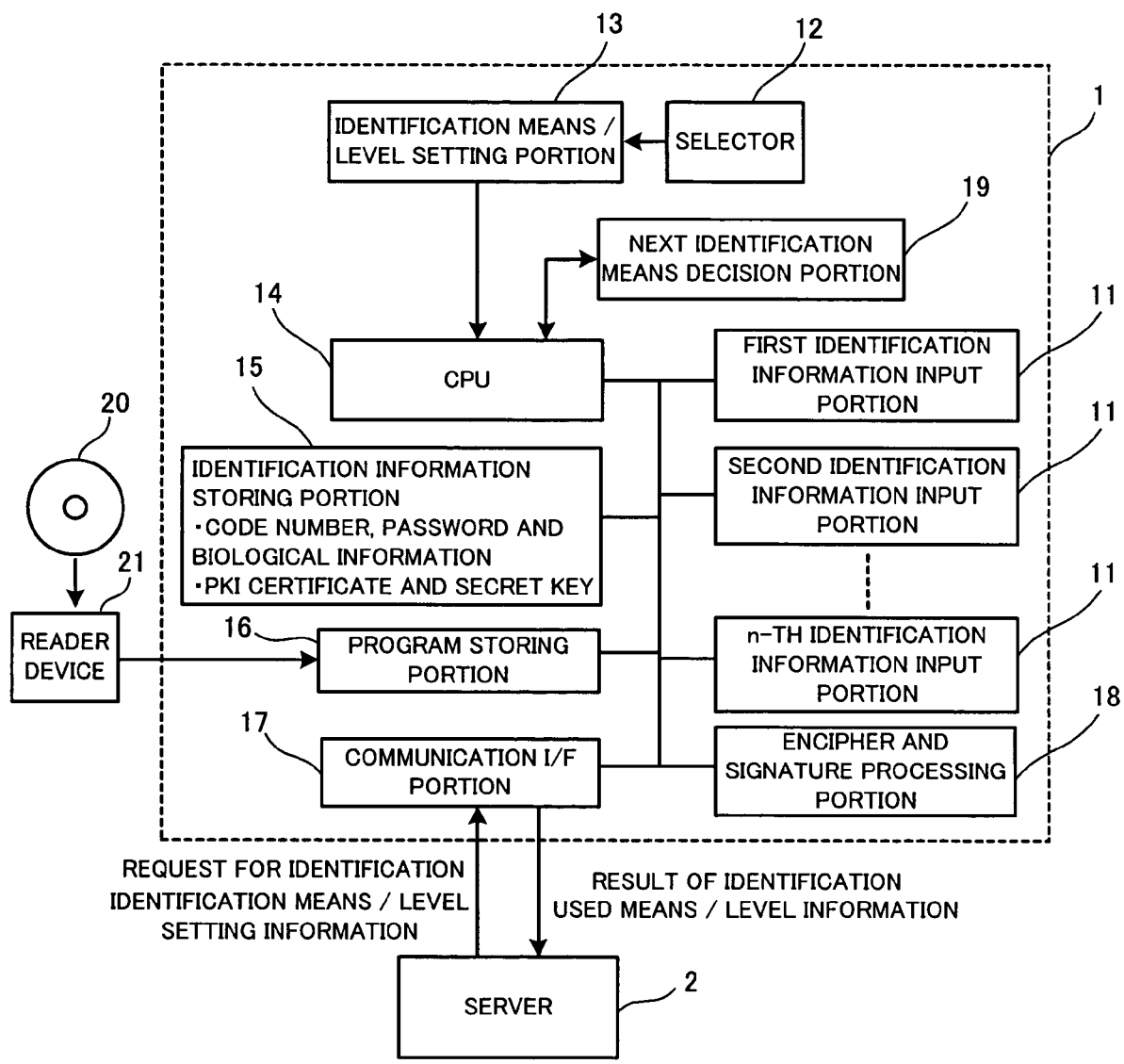
FIG. 1 is a block diagram showing an example of a structure of a personal identification terminal according to an embodiment of the present invention.

FIG. 1 is a block diagram showing an example of a structure of a personal identification terminal according to an embodiment of the present invention. This personal identification terminal 1 includes a plurality of (a first through n-th) identification information input portions 11 for performing identification utilizing plural types of identification means. The identification information input portions 11 can be conventional devices including, for example, a keyboard for entering a code number or a password and a sensor (such as a sensor chip, a microphone or a CCD camera) for entering biometric information (such as a finger print, a voice pattern or an iris pattern). In addition, the personal identification terminal 1 includes a selector 12 and an identification means/level setting portion 13 for selecting one of plural identification means or one of plural identification levels in accordance with a security level.

The personal identification terminal 1 further includes a CPU (a processor) 14, an identification information storing portion 15 and a program storing portion 16. The CPU 14 executes an identification (matching) process according to a program stored in the program storing portion 16. On that occasion, the identification process is executed by the identification means and at the identification level that are selected by the identification means/level setting portion 13. The identification information storing portion 15 stores identification information that is necessary for the identification process, i.e., a code number, a password, biometric information, a public key infrastructure (PKI) certificate, a secret key and others.

A program for executing the identification process is provided in a form recorded in a storage medium 20 such as a CD-ROM, and is installed via a reader device 21 in a program storing portion (a hard disk drive for example) 16. It is possible to download the program for the identification process via a communication interface portion 17 that will be explained later from another computer (a server) connected to a network so as to install the program in the program storing portion 16.

Furthermore, the personal identification terminal 1 includes the communication interface portion 17 and an encipher and signature processing portion 18. When the communication interface portion 17 works, the personal identification terminal 1 can be connected via a network to a server 2 that provides various services. When a user requests a service from the server 2 by using a terminal such as a personal computer, the server 2 sends a request for identification to a personal identification terminal 1 that the user can access (e.g., that is placed near the terminal) for confirming that the user is registered as an authorized user.

On this occasion, identification means/level setting information for designating identification means or an identification level to be used for the identification is sent from the server 2 to the personal identification terminal 1 together with the request for identification. Of course, it is possible that the identification means/level setting information is sent in a form included in the request for identification. In this case, the above-mentioned selector 12 and identification means/level setting portion 13 set the identification means or the identification level to be used in accordance with the identification means/level setting information received from the server 2.

In addition, the personal identification terminal 1 sends used means/level information for indicating identification means and an identification level that was used in the real identification back to the server 2 together with a result of the identification. This is for enabling the server 2 to confirm that the identification was performed correctly by the identification means and at the identification level that were designated by the identification means/level setting information sent from the server 2 to the personal identification terminal 1. This used means/level information is sent to the server 2 after a digital signature is added to it by an encipher/signature processing portion 18 so as to be protected from being altered (to be able to detect if it is altered). If necessary, the encipher/signature processing portion 18 also enciphers the used means/level information.

In addition, if the personal identification terminal 1 utilizes biometric information as the identification information, a score (similarity) that is calculated in the matching process or a hash value (a value calculated with a hash function) of the score is sent from the personal identification terminal 1 to the server 2 together with the result of the identification. Since a hash value of the score is sent instead of the score itself, security is improved in the same way as being enciphered.

Furthermore, the personal identification terminal 1 includes a next identification means decision portion 19. When the CPU 14 informs the next identification means decision portion 19 of a score obtained in the identification by the identification means utilizing certain biometric information, the next identification means decision portion 19 decides identification means utilizing biometric information to be used next in accordance with the score and informs the CPU 14 of the decided identification means. For example, it is supposed that the identification is performed by the identification means utilizing a voice pattern and the result was not sufficient to be OK (passed) though similarity (score) to a certain extent was obtained. In this case, the next identification means decision portion 19 will inform the CPU 14 that the identification means utilizing biometric information to be used next is identification means utilizing a finger print.

However, the next identification means decision portion 19 works when plural identification means are designated by the identification means/level setting information that was sent from the server 2. If only one identification means is designated, there is no room for the next identification means decision portion 19 to work.

In addition, if the score that was obtained by the identification by using identification means utilizing certain biometric information is smaller than a predetermined minimum level, the CPU 14 halts the process without proceeding to the next identification process. Furthermore, if the score that indicates a similarity when the identification was performed using identification means utilizing biometric information shows complete identity, the result of the identification is regarded as being false. In the identification using biometric information, due to an age variation of biometric information or difference between external environments, it is very rare that the biometric information for matching stored in the identification information storing portion 15 and the entered biometric information are identical to each other completely. Therefore, if the score shows complete identity, there is high probability that a user having a malicious intention had obtained the biometric information for matching by a certain method and entered the same. Therefore, in this case, the result of the identification is regarded as being false as explained above.

Figure 2:
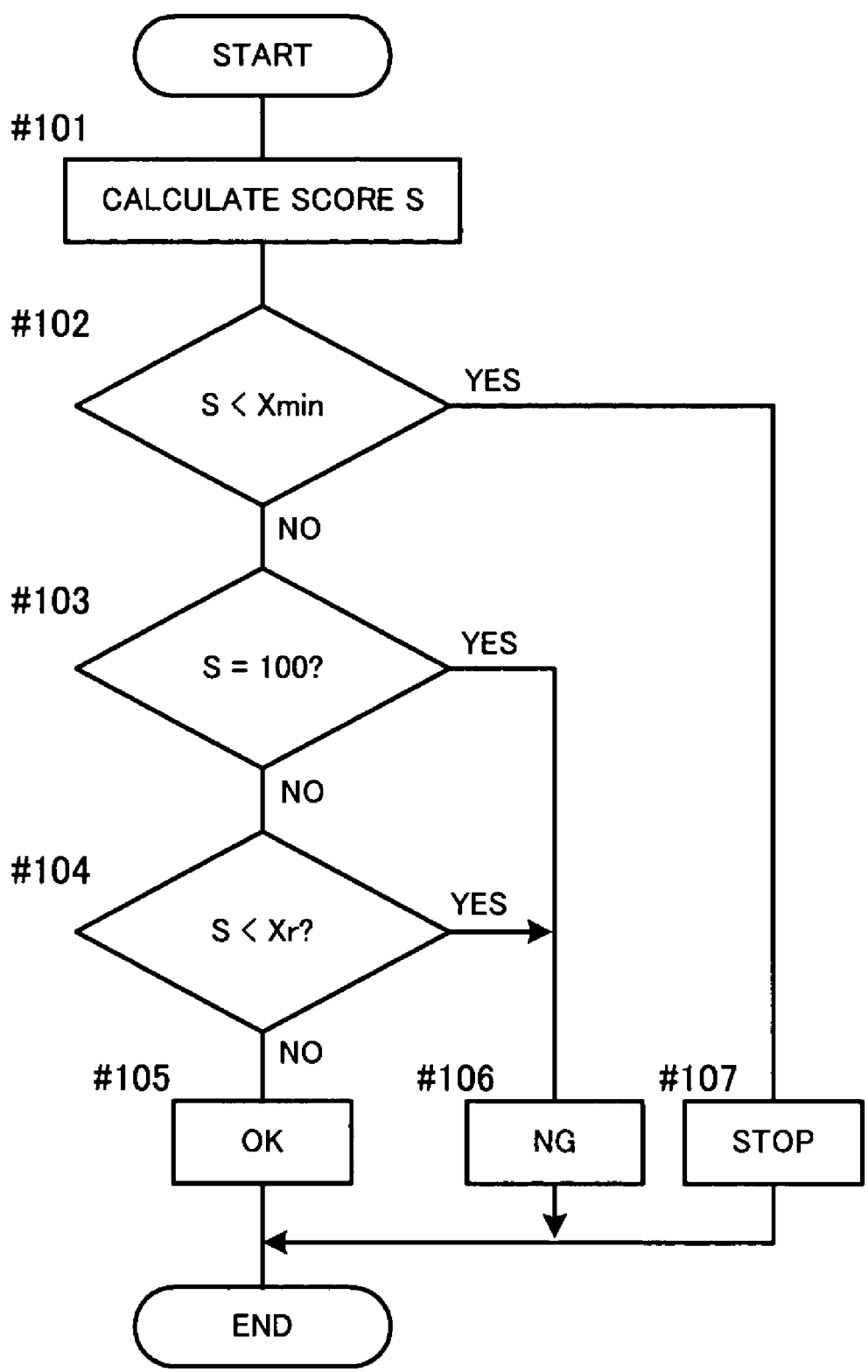
FIG. 2 is a flowchart showing an example of a matching process in a case where an identification means utilizing biometric information is used for the identification.

FIG. 2 is a flowchart showing an example of the matching process in a case where an identification means utilizing biometric information is used for the identification. First in Step #101, the score S is calculated. Namely, the biometric information that was entered from the identification information input portion 11 shown in FIG. 1 is compared with biometric information for matching that was read out of the identification information storing portion 15, so that the score S that is similarity is calculated. In the next Step #102, the score S is compared with a predetermined minimum level Xmin. If the score S is lower than the minimum level Xmin, the process is transferred to Step #107 and stopped.

If the score S is higher than the minimum level Xmin, it is checked whether or not the score S is 100 in the next Step #103. In this example, a value of the score S can be 0–100. If the score S is 100, which means that the biometric information for matching is identical to the entered biometric information perfectly, the process is transferred to Step #106 so that the result of the matching is NG (failed).

If the score S is not 100, the score S is compared with a pass/fail criteria value Xr in the next Step #104. If the score S is lower than the pass/fail criteria value Xr, the process is transferred to Step #106 so that the result of the matching is decided to be NG (failed). If the score S is equal to or higher than the pass/fail criteria value Xr, the process goes to Step #105 and it is decided that the result of the matching is OK (passed). The minimum level Xmin and the pass/fail criteria value Xr of the score S are preset in accordance with a security level.

Figure 3:
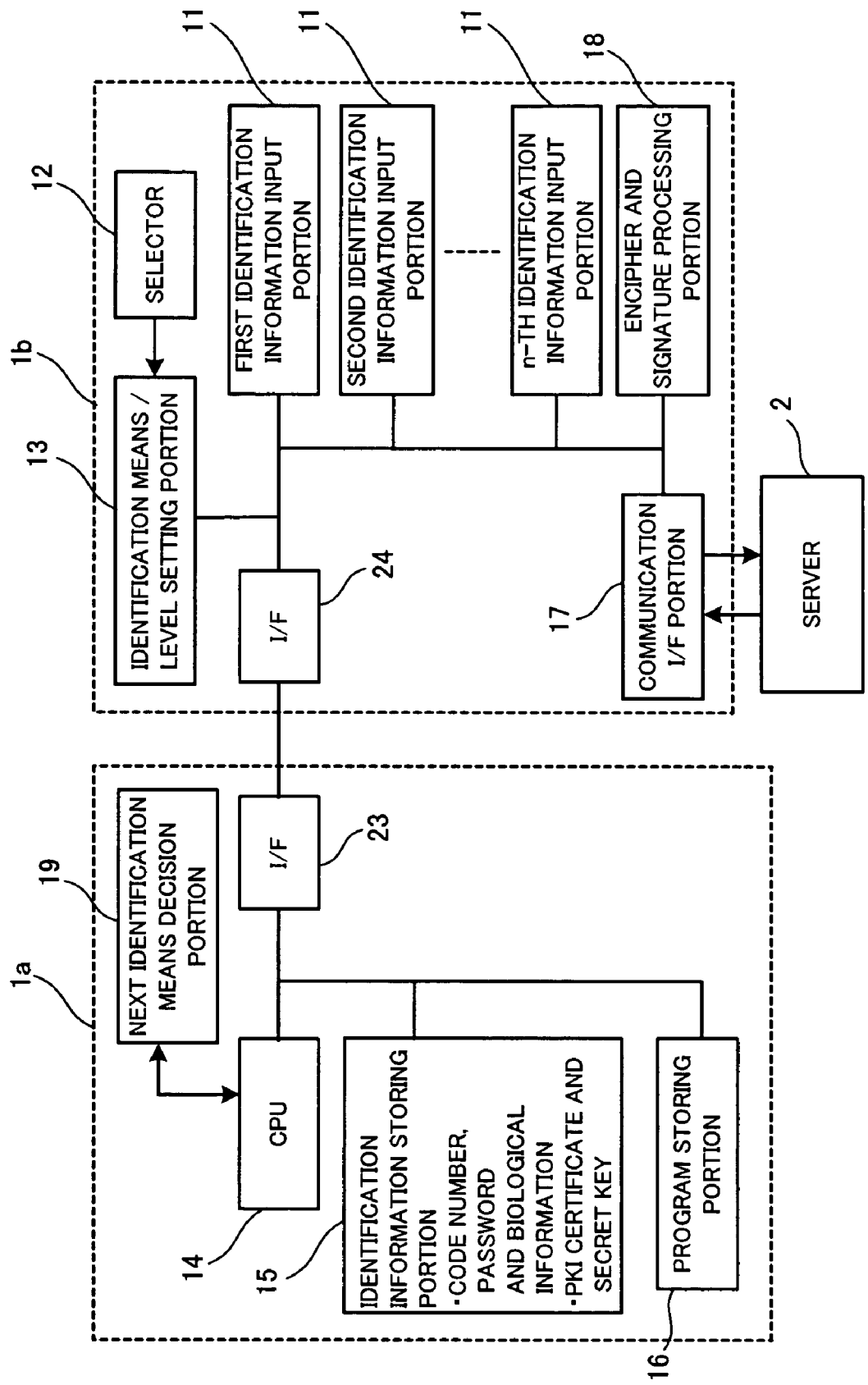
FIG. 3 is a block diagram showing an example where a combination of an IC card and an IC card reader/writer constitute the personal identification terminal.

FIG. 3 is a block diagram showing an example where a combination of an IC card 1a and an IC card reader/writer 1b constitute the personal identification terminal 1. In this example, the IC card 1a is provided with the CPU 14, the identification information storing portion 15, the program storing portion 16 and the next identification means decision portion 19, while the IC card reader/writer 1b is provided with the identification information input portion 11, the selector 12, the identification means/level setting portion 13, the communication interface portion 17 and the encipher/signature processing portion 18. In addition, each of the IC card 1a and IC card reader/writer 1b has a communication interface 23 or 24 for communication between them.

Figure 4:
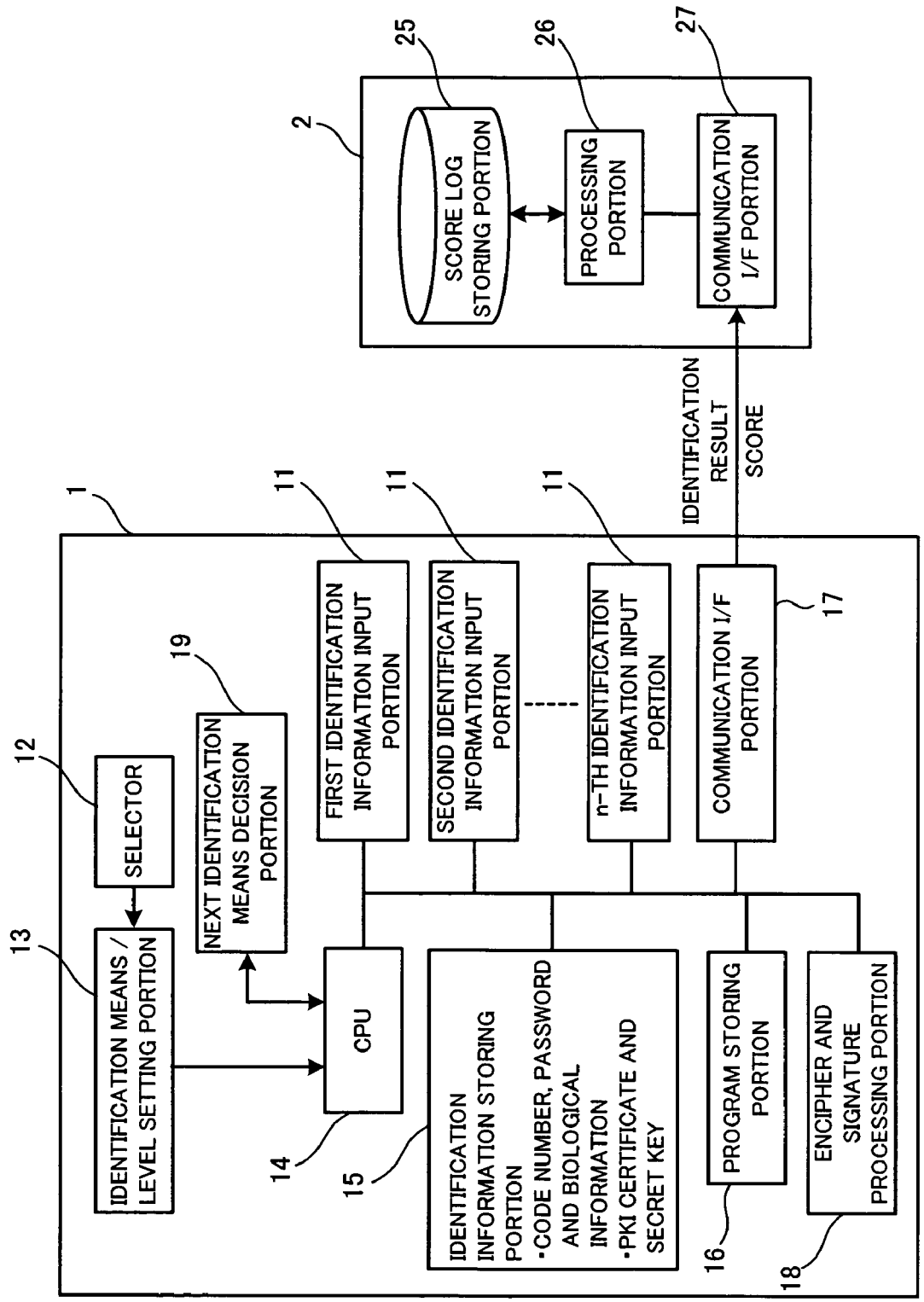
FIG. 4 is a block diagram of a system structure in which a server decides that the identification is failed when a predetermined condition is satisfied.

FIG. 4 is a block diagram of a system structure in which a server decides that the identification is failed when a predetermined condition is satisfied. The server 2 in this example includes a score log storing portion 25 for storing a log of the score that is added to the information of the identification result received from the personal identification terminal 1 via a communication interface portion 27, and a processing portion 26 for deciding that identification is failed when the same score value continues several times (e.g., five times) in accordance with the log of the score or the hash value of the score read out of the score log storing portion 25 despite the result of the identification received from the personal identification terminal. In the identification using biometric information, due to an age variation of biometric information or a variation of the external environments, it is very rare that the score indicating similarity in the identification has the same value every time. If the same score value continues several times, there is high probability that a user having a malicious intention produced the biometric information in an artificial manner and entered the biometric information every time. In this case, therefore, the server 2 decides that the identification is failed (NG) and does not provide a service.

Figure 5:
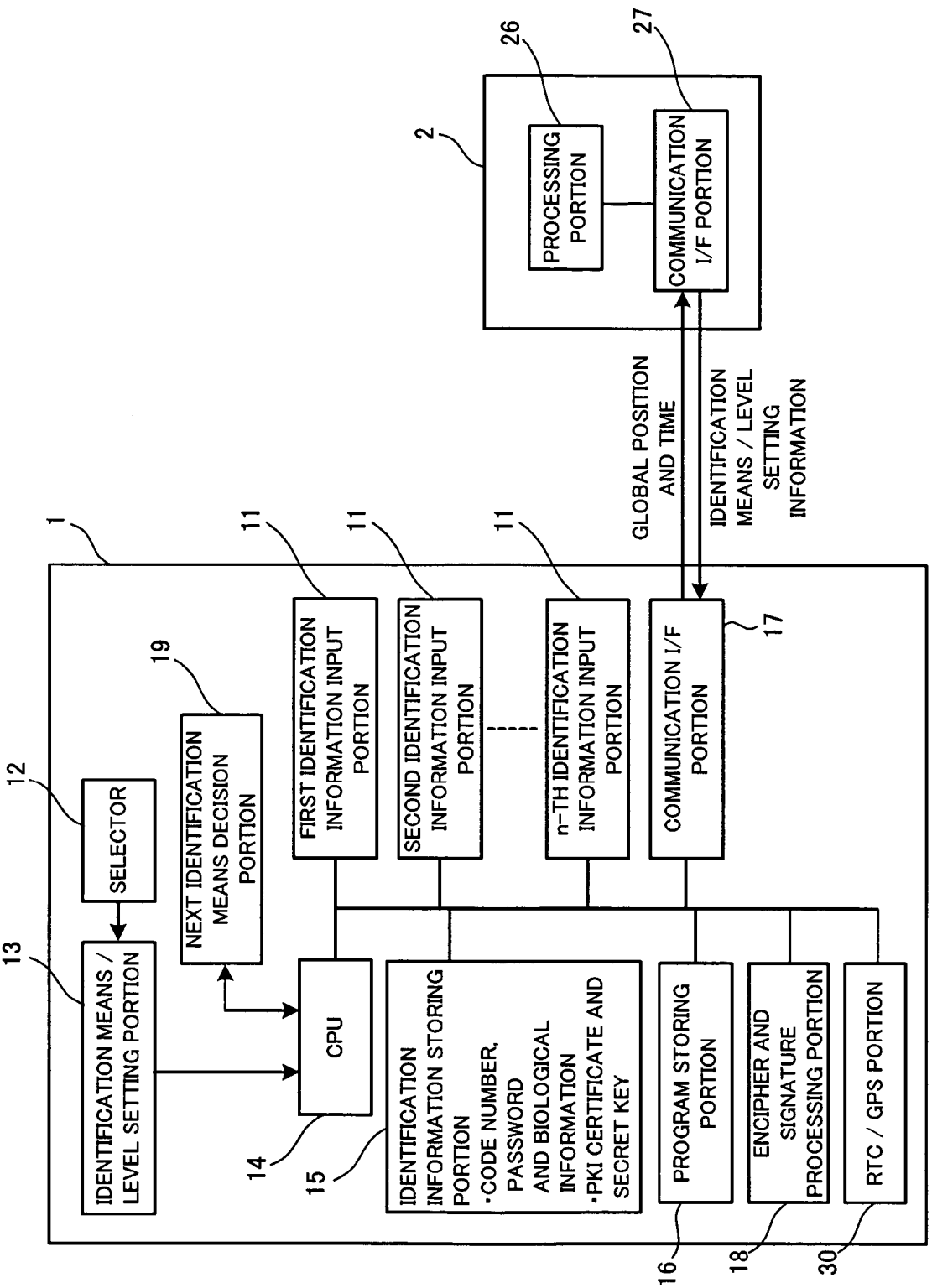
FIG. 5 is a block diagram of a system structure in which the server changes identification means/level setting information in accordance with information obtained from the personal identification terminal.

FIG. 5 is a block diagram of a system structure in which the server 2 changes the identification means/level setting information in accordance with information obtained from the personal identification terminal 1. In this example, the personal identification terminal 1 is provided with an RTC/GPS portion 30. The RTC (Real Time Clock) generates information of current date and time and delivers the information. The GPS (Global Positioning System) generates information of a global position of the personal identification terminal 1 and delivers the information.

Before the server 2 sends the request for identification and the identification means/level setting information to the personal identification terminal 1, the personal identification terminal 1 sends the identification terminal information including the information of current date and time and the information of the global position delivered from the RTC/GPS portion 30 to the server 2. The processing portion 26 of the server 2 changes the identification means/level setting information to be sent to the personal identification terminal 1 in accordance with the received identification terminal information. In this way, before the server 2 starts providing a service or every time when the server 2 performs the identification, the identification means and level are set in the personal identification terminal 1.

It is not always necessary that the identification terminal information includes both the information of current date and time and the information of a global position, but it is sufficient to include at least one of them. In addition, it is possible that the identification terminal information includes a device ID of the personal identification terminal 1.

Figure 6:
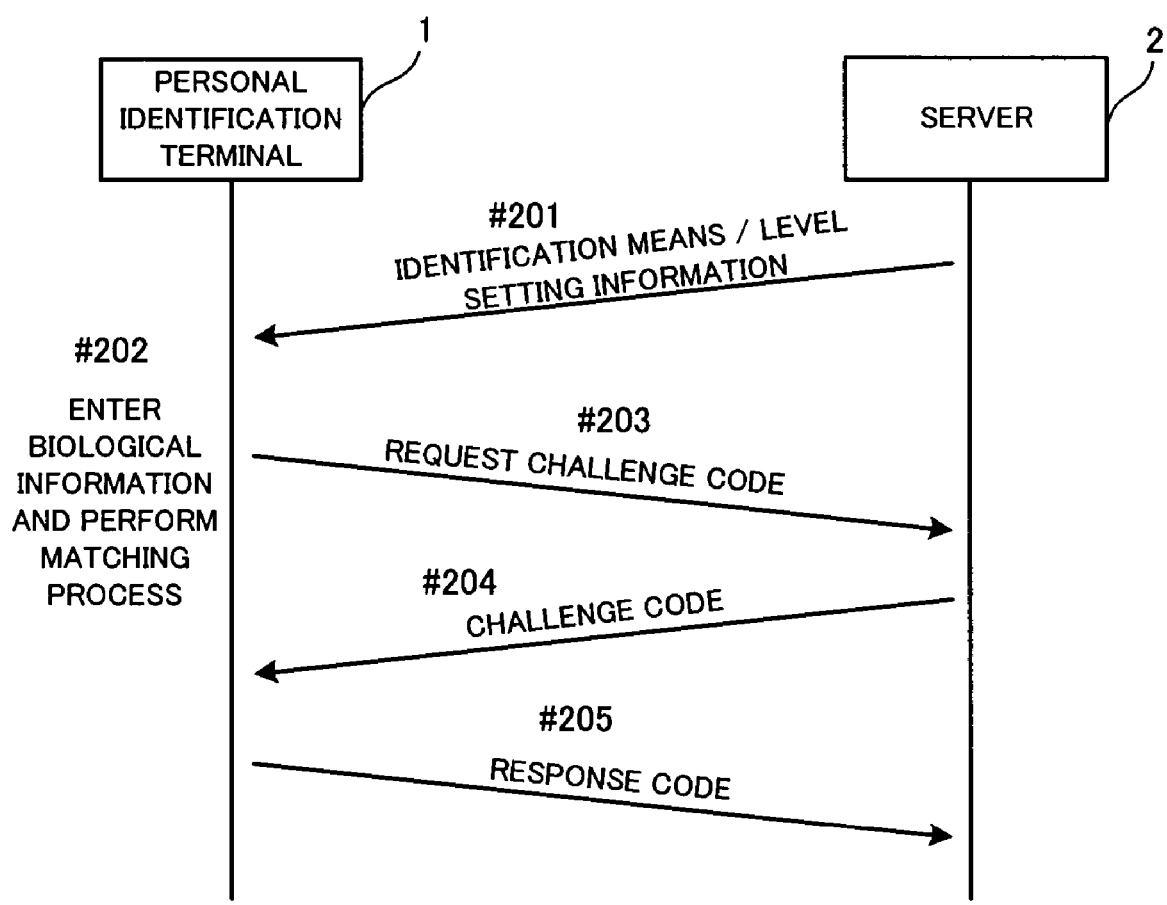
FIG. 6 is a diagram showing an example of a method for confirming an identification means or an identification level in accordance with challenge and response.

FIG. 6 is a diagram showing an example of a method for confirming an identification means or an identification level in accordance with challenge and response. First, the server 2 sends the identification means/level setting information to the personal identification terminal 1 (Step #201). When receiving the identification means/level setting information, the personal identification terminal 1 sets the identification means or the identification level in accordance with the identification means/level setting information and enters biometric information so as to perform the matching process (Step #202).

When the matching process is completed, the personal identification terminal 1 sends a request for challenge code (i.e., a notice of process completion) to the server 2 (Step #203). When receiving the request for challenge code, the server 2 sends a challenge code which is a random number to the personal identification terminal 1 (Step #204). When receiving the challenge code, the personal identification terminal 1 generates a response code by concatenating the random number, the used means/level information, the score or the hash value of the score and others, and sends the response code back to the server 2 (Step #205). On this occasion, a PKI signature for detecting an alteration is added to the response code. When receiving the response code, the server 2 can confirm that the identification was performed by the designated identification means and identification level from the response code.

FIG. 7 is a diagram showing an example of a structure for limiting the number of usable times of a secret key of a user when the result of the identification is OK (passed). When the user (the personal identification terminal 1) sends a request for a service to the server 2 in Step #301, the server 2 sends usable time setting information for designating the number of usable times of the secret key to the personal identification terminal 1 together with the identification means/level setting information (Step #302). When receiving the identification means/level setting information and the usable time setting information, the personal identification terminal 1 sets the identification means or the identification level to be used in accordance with the identification means/level setting information and enters the biometric information so as to perform the matching process (Step #303). When the matching process is finished, the personal identification terminal 1 sends the request for challenge code (the notice of process completion) to the server 2 (Step #304).

Furthermore, if the identification result is OK (passed), the personal identification terminal 1 sets the number of usable times of the secret key in a use time counter and performs a use time management process in which the use time counter is decremented every time when the secret key is used (Step #305). When the value of the use time counter becomes zero, the secret key cannot be used any more.

When receiving the request for challenge code, the server 2 generates a challenge code which is a random number and sends the challenge code to the personal identification terminal 1 (Step #306). When receiving the challenge code, the personal identification terminal 1 generates a response code by concatenating the random number, the used means/level information, the score or the hash value of the score and the information of the number of usable times, and sends the response code back to the server 2 (Step #307). On this occasion, a PKI signature for detecting an alteration is added to the response code. When receiving the response code, the server 2 can confirm that the identification was performed by the designated identification means and identification level and that the number of usable times is not altered from the response code.

While the presently preferred embodiments of the present invention have been shown and described, it will be understood that the present invention is not limited thereto, and that various changes and modifications may be made by those skilled in the art without departing from the scope of the invention as set forth in the appended claims.

What is claimed is:

1. A personal identification terminal comprising:
   a plurality of identification conditions including identification means and identification levels that are selectable for use; and
   means for selecting one of the plural identification conditions to perform identification, according to identification condition setting information received from a server every time a request for identification is received from the server,
   wherein the identification condition setting information received from the server includes a digital signature for detecting an alteration thereof; and
   means for sending to the server, as a confirmation, identification condition used by the personal identification terminal for the identification, in a format enabling detection of an alteration thereof, together with a result of the identification.

2. A personal identification terminal according to claim 1, wherein if the identification condition that is designated by the identification condition setting information does not exist, default identification condition is used so as to perform the personal identification.

3. A personal identification terminal according to claim 1, wherein the format that enables detection of an alteration is based on a network authentication protocol utilizing a secret key.

4. A personal identification terminal according to claim 3, wherein different secret keys are used for different identification conditions.

5. A personal identification terminal according to claim 1, wherein the used condition information is added to information of the result of the identification, which is enciphered or provided with a digital signature before being sent to the server.

6. A personal identification terminal according to claim 1, wherein in the case where identification means utilizing biometric information is used, a score indicating a similarity or a hash value of the score is added to the information of the result of the identification.

7. A personal identification terminal according to claim 1, further comprising a next identification means decision portion for deciding identification means utilizing biometric information that should be used next in accordance with a score that indicates a similarity when the identification was performed using identification means utilizing biometric information.

8. A personal identification terminal according to claim 7, wherein if the score that indicates a similarity when the identification was performed using identification means utilizing biometric information is lower than a predetermined minimum level, the process is stopped without proceeding to the next identification process.

9. A personal identification terminal according to claim 1, wherein if the score that indicates a similarity when the identification was performed using identification means utilizing biometric information shows complete identity, the result of the identification is regarded as being false.

10. A personal identification terminal according to claim 1 wherein a combination of an IC card and an IC card reader/writer constitutes the terminal.

11. A server that is connected to a personal identification terminal including a plurality of identification conditions including identification means and identification levels that are selectable for use, the server comprising a programmed computer processor controlling the server according to a process comprising:

sending to the personal identification terminal identification condition setting information for designating one of the plural identification conditions of identification means and identification levels to be selected by the personal identification terminal to perform identification, every time a request for identification is sent from the server to the personal identification terminal;

storing a log of a score that indicates a similarity, if the personal identification terminal performed the identification using biometric information, or a hash value of the score, that was added to result information of the identification received from the personal identification terminal according to the sending of the identification condition setting information; and failing the identification, if same score value continues several times in accordance with the read log of the score or the hash value of the score, despite a result of the identification received from the personal identification terminal.

12. A method of personal identification comprising: sending by a server identification condition setting information together with a request for identification to a personal identification terminal including a plurality of identification conditions including identification means and identification levels that are selectable for use by the personal identification terminal to perform the identification;

selecting by the personal identification terminal one of the plural identification conditions to perform identification, according to the identification condition setting information received from the server; and sending by the personal identification terminal to the server, as a confirmation, identification condition used by the personal identification terminal for the identification, in a format that enables detection of an alteration thereof together with a result of the identification.

13. The method according to claim 12, further comprising:

sending identification terminal information including a location and a current time from the personal identification terminal to the server, before sending the request for identification and the identification condition setting information from the server to the personal identification terminal; and changing the identification condition setting information to be sent to the personal identification terminal by a processing portion of the server in accordance with the identification terminal information that was received from the personal identification terminal.

14. The method according to claim 12, further comprising sending information for designating a number of usable times of a secret key, together with the request for identification and the identification condition setting information sent from the server to the personal identification terminal, to limit a number of usable times of the secret key by a user, when a result of the identification is OK.

15. A computer program that is installed in a personal identification terminal having a plurality of identification conditions including identification means and identification levels that are selectable for use, the computer program makes a processor of the personal identification terminal execute a process comprising:

selecting one of the plural identification conditions to perform identification, according to identification condition setting information received from a server every time a request for identification is received from the server; and sending, as a confirmation, identification condition used by the personal identification terminal for the identification to the server, in a format that enables detection of an alteration thereof, together with a result of the identification.

16. A computer readable storage medium storing a computer program that is installed in a server communicably connectable to a personal identification terminal having a plurality of identification conditions including identification means and identification levels that are selectable for use, the computer program makes a processor of the server execute a process comprising:

sending to the personal identification terminal identification condition setting information for designating one of the plural identification conditions of identification means and identification levels to be selected by the personal identification terminal to perform identification, every time a request for identification is sent from the server to the personal identification terminal;

storing a log of a score that indicates a similarity, if the personal identification terminal performed the identification using biometric information, or a hash value of the score, that was added to result information of the identification received from the personal identification terminal according to the sending of the identification condition setting information; and failing the identification, if same score value continues several times in accordance with the read log of the score or the hash value of the score, despite a result of the identification received from the personal identification terminal.

* * * * *